(12) United States Patent
Subramanian et al.

(10) Patent No.: US 9,716,259 B2
(45) Date of Patent: Jul. 25, 2017

(54) BRACKET ATTACHMENT STRUCTURE WITH FAULT FOLDS

(71) Applicant: Ford Global Technologies, LLC, Dearborn, MI (US)

(72) Inventors: Rajaram Subramanian, Ann Arbor, MI (US); Amar Marpu, Canton, MI (US); Saravanan Paramasivam, South Lyon, MI (US); Mladen Marjanovic, Windsor (CA); John Jardine, Harrison Twp., MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 14/857,004

(22) Filed: Sep. 17, 2015

(65) Prior Publication Data
US 2017/0084890 A1    Mar. 23, 2017

(51) Int. Cl.
*H01M 2/10* (2006.01)

(52) U.S. Cl.
CPC ...... *H01M 2/1083* (2013.01); *H01M 2220/20* (2013.01)

(58) Field of Classification Search
CPC ........... H01M 2/1077; H01M 10/5016; H01M 2/202; H01M 2/0237; H01M 2/10; H01M 2/1005; H01M 2/1083; H01M 2/1088; H01M 2/1094; H01M 2/12; H01M 2/1252
See application file for complete search history.

(56) References Cited

U.S. PATENT DOCUMENTS

| 6,227,322 B1 | 5/2001 | Nishikawa | |
| 2014/0017538 A1* | 1/2014 | Nakamori | H01M 2/1077 429/99 |
| 2014/0302378 A1* | 10/2014 | Tsuruta | H01M 2/1077 429/156 |

FOREIGN PATENT DOCUMENTS

| EP | 2555277 B1 | 12/2013 |
| WO | 2015019742 A1 | 2/2015 |

* cited by examiner

Primary Examiner — Mark F Huff
Assistant Examiner — Monique Wills
(74) Attorney, Agent, or Firm — David B. Kelley; Brooks Kushman P.C.

(57) ABSTRACT

A vehicle underbody includes a tray structure, a battery pack having a plurality of footers and a bracket; and an enclosure surrounding the battery pack. The bracket has a wall attached to the enclosure, a ledge attached to the footers, and a stepped deformation region between the wall and ledge. The stepped deformation region deforms in response to impact to absorb energy associated with the impact.

16 Claims, 3 Drawing Sheets

BRACKET ATTACHMENT STRUCTURE WITH FAULT FOLDS

TECHNICAL FIELD

The present disclosure relates to enclosures for electric vehicle batteries.

BACKGROUND

Batteries may be used in vehicles to power an electric machine to increase fuel economy. The batteries are attached to a floor of the vehicle using a tray structure. The tray structure includes an enclosure, which uses a bracket to secure the battery to the tray structure within the enclosure. The bracket provides a rigid attachment between the tray structure and battery. The bracket also provides a durable support for the battery during operation of the vehicle.

SUMMARY

A tray structure for a vehicle battery includes an enclosure for the battery, a plurality of footers attached to the battery, and a bracket. The bracket interconnects the enclosure and footers, and defines a wall extending along an inner surface of the enclosure, a ledge attached to the footers, and a channel therebetween configured to deform during impact such that the wall moves toward the ledge to reduce impact energy transfer to the battery.

A vehicle underbody includes a tray structure, a battery pack having a plurality of footers and a bracket, and an enclosure surrounding the battery pack. The bracket has a wall attached to the enclosure, a ledge attached to the footers, and a stepped deformation region therebetween configured to deform in response to impact to absorb energy associated with the impact.

A vehicle includes a traction battery arrangement having a base, an enclosure surrounding the traction battery arrangement and attached to a tray structure of the vehicle, and a bracket having a ledge attached to the base, a wall attached to the enclosure, and an intermediate portion disposed therebetween. The intermediate portion is configured to, in response to an impact force being applied perpendicular to the wall, fold such that the wall displaces at an angle relative to the force toward the ledge to absorb energy associated with the impact.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
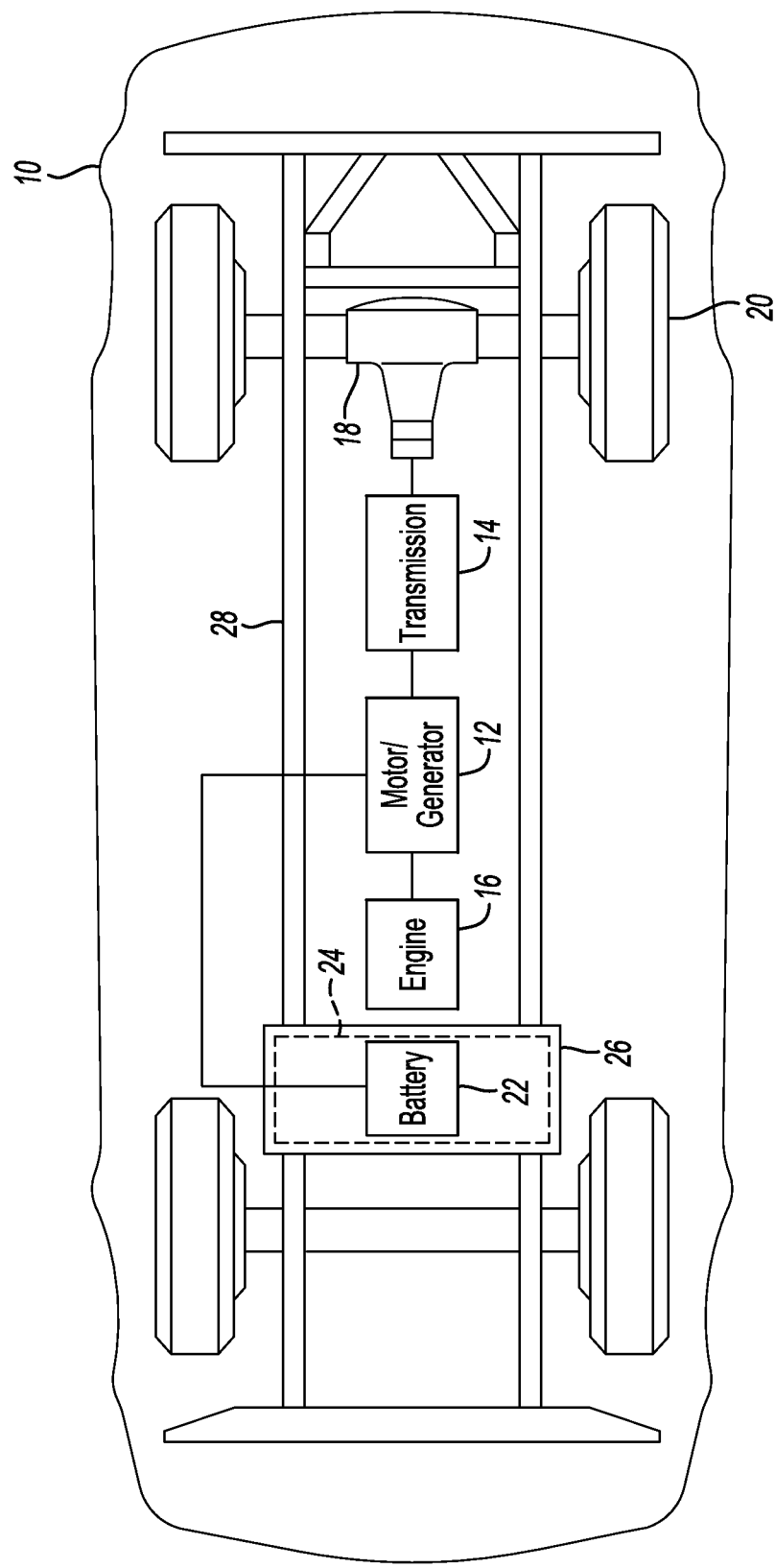
FIG. 1 is a top view of a hybrid electric vehicle.

FIG. 1 depicts a schematic of a typical hybrid-electric vehicle 10. Certain embodiments, however, may also be implemented within the context of plug-in hybrids and fully electric vehicles. The vehicle 10 includes one or more electric machines 12 mechanically connected to a hybrid transmission 14. In at least one embodiment, a single electric machine 12 may be mechanically connected to the hybrid transmission 14. The electric machine 12 may be capable of operating as a motor or a generator. In addition, the hybrid transmission 14 may be mechanically connected to an engine 16. The hybrid transmission 14 may also be mechanically connected to a drive shaft 18 that is mechanically connected to the wheels 20. The electric machine 12 can provide propulsion through the drive shaft 18 to the wheels 20 and deceleration capability when the engine 16 is turned on or off. The electric machine 12 also acts as a generator and can provide fuel economy benefits by recovering energy through regenerative braking. The electric machine 12 reduces pollutant emissions and increases fuel economy by reducing the work load of the engine 16.

A traction battery or battery pack 22 stores energy that can be used by the electric machine 12. The traction battery 22 typically provides a high voltage direct current (DC) output from one or more battery cell arrays, sometimes referred to as battery cell stacks, within the traction battery 22. The battery cell arrays may include one or more battery cells. The traction battery 22 may be supported by an enclosure 24 of a tray structure 26 of the vehicle 10. The tray structure 26 is bolted to an underbody structure 28 of the vehicle 10.

The tray structure 26 may be configured to provide stiffness and durability to the traction battery 22 during normal vehicle operation. For example during normal vehicle operation, noise, vibration, and harshness may be imposed through the enclosure 24 and tray structure 26 to the traction battery 22. Maintaining integrity of the traction battery 22 allows the electric machine 12 to propel the vehicle 10 over a longer period of travel. This reduces the fuel consumption by the engine 16. Further, in the event of a load applied to the enclosure 24, for example a side impact, energy may be transferred through the enclosure 24 and tray structure 26 to the traction battery 22. The tray structure 26 may need to be designed such that the enclosure 24 maintains durability and stiffness to compensate for noise, vibration, and harshness as well as to absorb energy when a load is applied to the tray structure 26.

Figure 2:
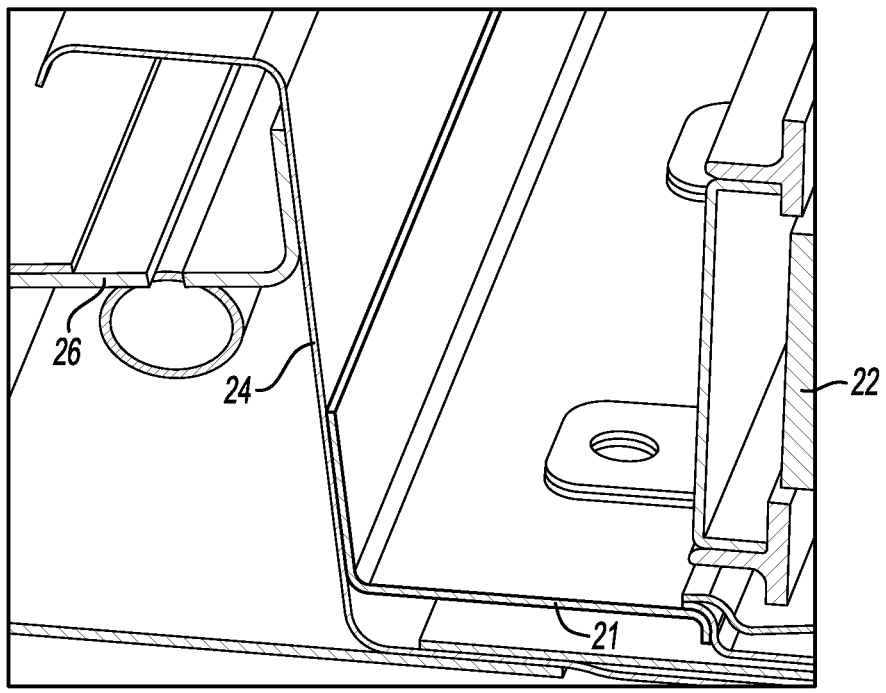
FIG. 2 is a perspective view of a prior art bracket attached to a traction battery array support structure.

FIG. 2 depicts a perspective view of a prior art support bracket 21 used to attach the traction battery 22 to the battery enclosure 24. The support bracket 21 provides a rigid attachment between the traction battery 22 and the vehicle enclosure 24, which allows the traction battery 22 to maintain durability and stiffness during normal vehicle travel. However in the event of vehicle impact, the support bracket 21 may directly transfer energy associated with the impact on the enclosure 24 to the traction battery 22.

Figure 3:
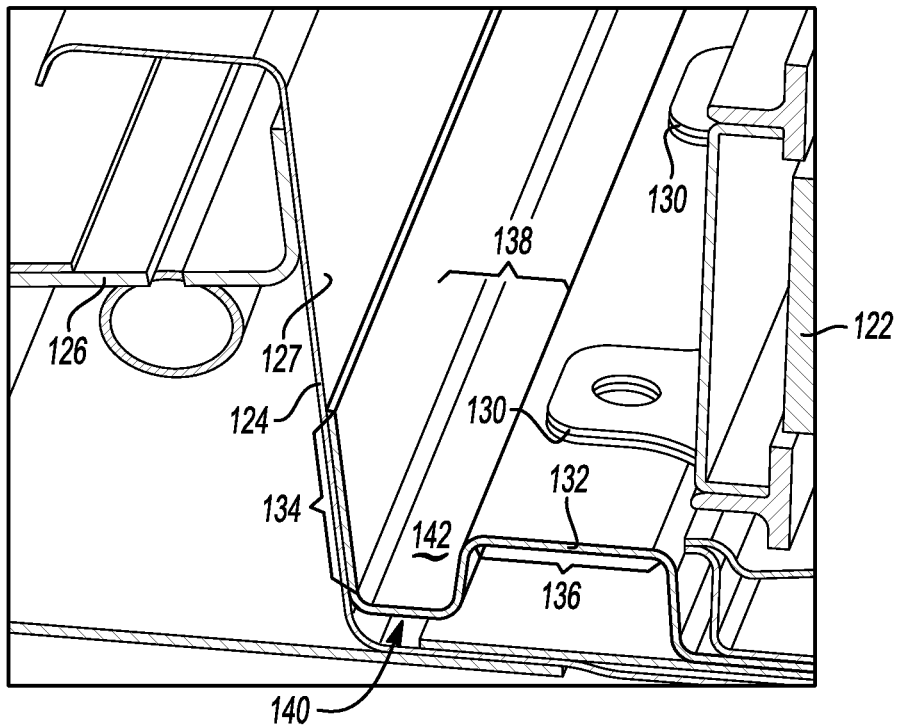
FIG. 3 is a perspective view of a bracket attached to a traction battery array support structure.

Referring to FIG. 3, a perspective view of a traction battery 122 and tray structure 126 is shown. (Similarly numbered elements may have similar descriptions.) The traction battery 122 is supported on a vehicle via the tray structure 126. The traction battery 122 uses a plurality of connecting mechanisms 130, or footers, to attach the traction battery 122 to an enclosure 124 of the tray structure 126. The footers 130 provide a rigid attachment between the traction battery 122 and enclosure 124. Due to the stiffness and rigidity of the attachment between the traction battery 122 and enclosure 124, energy imparted to the vehicle during impact may travel to the traction battery 122 via the footers 130.

The traction battery 122 is fixed to the enclosure 124 through a support bracket 132. That is, the support bracket 132 interconnects the traction battery 122 and enclosure 124. The support bracket 132 may also provide a rigid attachment for the traction battery 122 within the enclosure 124 while providing a mechanism for absorbing energy transfer through the vehicle. For example, a wall 134 of the support bracket 132 may attach to an inner surface 127 of the enclosure 124, and the footers 130 may attach to a ledge 136 of the support bracket 132 within the enclosure 124. The wall 134 may be spaced from the ledge 136 by a deformation region 138.

The deformation region 138 provides enough stiffness and rigidity to prevent damage to the traction battery 122 during normal vehicle operation as well as allows the support bracket 132 to absorb energy that may be transferred through the vehicle. For example when the support bracket 132 is impacted, the deformation region 138 has a contour 140 such that the support bracket 132 deforms at the deformation region 138. The contour 140 may account for energy absorption through the support bracket 132 by design. For example, the contour 140 may be such that the deformation region 138 folds. Likewise, the contour 140 may be such that the deformation region 138 crumples, buckles, or plastically deforms. That is, energy from an impact is absorbed by the support bracket 132 through folding, buckling, or deforming of the deformation region 138. The deformation region 138 of the support bracket 132 further aids the tray structure 126 to secure the traction battery 122 to the enclosure 124.

In the example of FIG. 3, the contour 140 is a channel 142 that extends the length of the bracket 132. When a sufficient impact load is applied to the tray structure 126, the channel 142 is configured such that it crumples, allowing the deformation region 138 to absorb energy from the applied load.

The channel 142 may be substantially U-shaped. Therefore, the wall 134 may be substantially perpendicular to the ledge 136. When a sufficient impact load is applied, the channel 142 crumples and the wall 134 moves laterally toward the ledge 136. After impact, the channel 142 may still be substantially U-shaped. The distance between the wall 134 and ledge 136, however, is decreased. Deforming the channel 142 within the deformation region 138 and decreasing the distance between the wall 134 and ledge 136 absorbs energy from the impact load. By absorbing the energy, less energy is transferred to the footers 130 associated with the traction battery 122.

Reducing energy transfer to the footers 130 may substantially reduce energy transfer from the tray structure 126 and enclosure 124 through the support bracket 132 and to the traction battery 122. The support bracket 132 may also have a uniform thickness. The channel 142 further protects the traction battery 122 and manages impact load energy without increasing the thickness of the support bracket 132. Moreover, maintaining a uniform thickness of the support bracket 132 eliminates potential compromises on structural durability or stiffness of the support bracket 132. The channel 142 may reduce deformation to a corresponding support structure and the traction battery 122 without requiring manufacturing modifications or assembly of additional parts.

Figure 4:
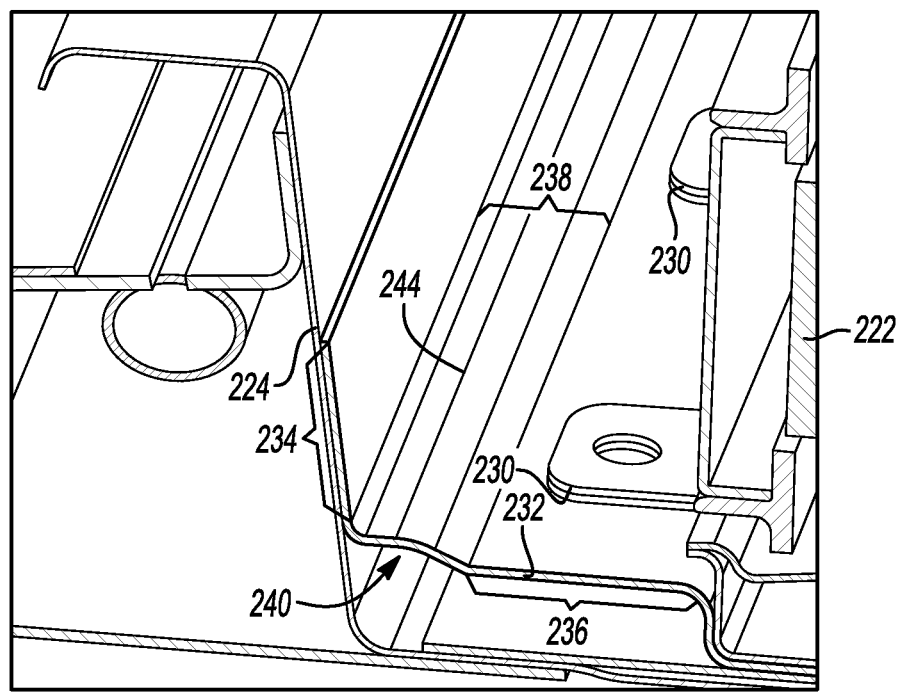
FIG. 4 is a perspective view of a bracket attached to a traction battery array support structure.

FIG. 4 depicts a perspective view of another support bracket 232 having a deformation region 238. The deformation region 238 interconnects a wall 234 and ledge 236 of the support bracket 232, and has a contour 240 designed to fold. The wall 234 is attached to an enclosure 224, and the ledge 236 is attached to footers 230 that are associated with a traction battery 222. The contour 240 of the deformation region 238 may be designed such that when a load is applied to the support bracket 232, the wall 234 displaces substantially diagonally toward the ledge 236 to absorb energy. The contour 240 may therefore be defined at an angle between the wall 234 and ledge 236 to form a step therebetween.

The deformation region 238 may also be designed with a fold-line 244 to further influence where the support bracket 232 folds to absorb energy. The fold-line 244 allows the support bracket 232 to absorb energy by displacing the wall 234 angularly toward the ledge 236. The fold-line 244 may be configured such that the deformation region 238 collapses along the fold-line 244. During impact, the support bracket 232 deforms at the fold-line 244 to absorb impact energy. The fold-line 244 allows the support bracket 232 to direct the impact energy to the deformation region 238, wherein it can be absorbed, to reduce the amount of impact energy transferred to the footers 230. The fold-line 244 also allows the contour 240 to act as a fault, in which the wall 234 displaces toward the ledge 236 along the fold-line 244. The contour 240 of the fold-line 244 influences how the support bracket 232 absorbs energy. For example, the support bracket 232 may be formed having a uniform thickness, which allows the support bracket 232 to maintain substantial rigidity for the support structure during normal vehicle operation.

Utilizing the contour 240 to maintain a uniform thickness of the support bracket 232 aids in reducing deformation to the traction battery 222 during impact. The contour 240, configured to fold along the fold-line 244, allows the support bracket 232 to provide durability and reductions in noise, vibration, and harshness while reducing the energy being transferred from the enclosure 224 to the footers 230. Therefore, the contour 240 may be designed to optimize performance of the traction battery 222. Further, by designing a fold-line 244 within the deformation region 238, the support bracket 232 requires no additional manufacturing: The fold-line 244 allows the support bracket 232 to manage impact energy without incurring additional costs or manufacturing expenses.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle battery tray structure comprising:
an enclosure for a battery;
a plurality of footers attached to the battery; and
a bracket interconnecting the enclosure and footers, and defining a wall extending along an inner surface of the enclosure, a ledge attached to the footers, and a stepped channel therebetween configured to deform during impact such that the wall moves diagonally toward the ledge to reduce impact energy transfer to the battery during deformation.

2. The vehicle battery tray structure of claim 1, wherein the channel is U-shaped in cross-section.

3. The vehicle battery tray structure of claim 1, wherein a thickness of the bracket is uniform through the wall, channel and ledge.

4. The vehicle battery tray structure of claim 1, wherein the bracket has a thickness sufficient to maintain a rigid connection between the enclosure and battery.

5. The vehicle battery tray structure of claim 1, wherein the wall and ledge are formed perpendicular to each other.

6. A vehicle underbody comprising:
a tray structure;
a battery pack having a plurality of footers and a bracket; and
an enclosure surrounding the battery pack, wherein the bracket has a wall attached to the enclosure, a ledge attached to the footers, and a stepped deformation region therebetween configured to deform in response to impact to absorb energy associated with the impact such that the wall displaces diagonally toward the ledge during deformation.

7. The vehicle underbody of claim 6, wherein the stepped deformation region defines a fold line and wherein deforming in response to impact includes folding of the bracket along the fold line.

8. The vehicle underbody of claim 6, wherein the stepped deformation region has a same thickness as the wall and ledge.

9. The vehicle underbody of claim 6, wherein the deformation region is defined at an angle from the wall to the ledge.

10. The vehicle underbody of claim 6, wherein the wall and ledge are formed perpendicular to each other.

11. A vehicle comprising:
a traction battery arrangement having a base;
an enclosure surrounding the traction battery arrangement and attached to a tray structure of the vehicle; and
a bracket having a ledge attached to the base, a wall attached to the enclosure, and an intermediate portion disposed therebetween configured to, in response to an impact force being applied perpendicular to the wall, fold such that the wall displaces at an angle relative to the force toward the ledge to absorb energy associated with the impact.

12. The vehicle of claim 11, wherein the intermediate portion has a stepped configuration.

13. The vehicle of claim 11, wherein the intermediate portion defines a fold line and wherein the intermediate portion folds along the fold line.

14. The vehicle of claim 11, wherein the bracket has a uniform thickness.

15. The vehicle of claim 11, wherein the wall is orthogonal to the ledge.

16. The vehicle of claim 11, wherein the wall is perpendicular to the ledge.

* * * * *